Oct. 31, 1967     T. D. LODE     3,349,684
COPYING MACHINE EXPOSURE CONTROL
Filed Oct. 26, 1964
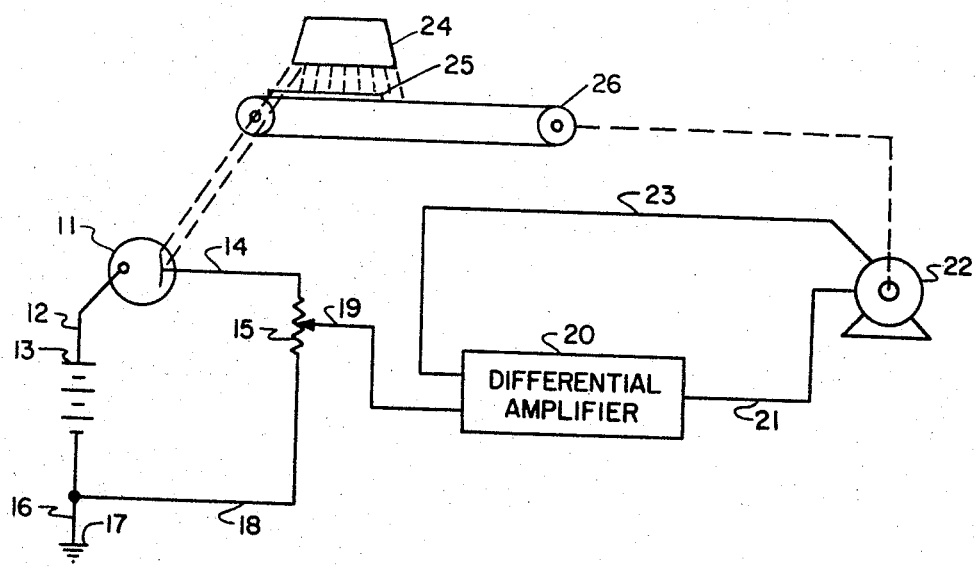
INVENTOR
TENNY D. LODE United States Patent Office 3,349,684
Patented Oct. 31, 1967

3,349,684
COPYING MACHINE EXPOSURE CONTROL
Tenny D. Lode, Madison, Wis., assignor to Rosemount Engineering Company, Minneapolis, Minn., a corporation of Minnesota
Filed Oct. 26, 1964, Ser. No. 406,359
2 Claims. (Cl. 95—75)

ABSTRACT OF THE DISCLOSURE

In this specification, there is disclosure of a simple exposure control for use in copying machines wherein a sheet of paper is passed by a light and subsequently the exposed sheet of paper is developed. The control comprises a photoelectric cell which receives a portion of the light from the light source, thereby giving an output current proportional to the light intensity. This output current passes through a manually adjustable potentiometer to a differential amplifier. The differential amplifier is used for driving a variable speed motor which controls the rate of travel of the sheet of material past the light. The variable speed motor includes a tachometer type feed back means into the differential amplifier. If the feed back voltage differs from the voltage coming from the photoelectric cell and adjustable potentiometer, the motor speed will either be increased or decreased by the differential amplifier until these signals are equal or at some other desired ratio.

Thus if the light intensity is low, the motor will be run slowly so that the photo sensitive sheet is exposed properly. If the light intensity is high, the motor will be run at a higher speed because of the increase in current flowing through the photo sensitive cell.

---

This invention relates to copying machines, for example, of the type used for the reproduction of engineering drawings. More particularly, it relates to the control of the degree of exposure of the sensitized paper to active light in such machines.

It has become a common practice to make original engineering drawings in pencil upon sheets which are at least partially transparent. These original drawings may then be copied by placing a sheet of light sensitive paper behind the original, exposing the combination to light and subsequently developing the exposed sensitized sheet. A number of different processes and copying machines have been developed for this purpose. These processes are known, for example, as blue printing, white printing, blue-line printing, and diazo printing. For convenience in manufacture and handling, the sensitive paper is usually only slightly sensitive to light and is exposed under intense ultra-violet light. In several models of commonly used copying machines, the combination of original drawing and sensitive paper is carried past an intense light by moving belts or other mechanical means. The exposure is varied by varying the speed at which the sensitive paper and original drawing are carried past the light. The usual means of exposure control is to use a motor whose speed may be electrically varied and/or a variable speed mechanical transmission.

One problem with such machines is that the desirable exposure will vary with the light output of the exposing lamp. Since the light output may vary with the electric power line voltage, the age of the lamp, and during machine warm-up for approximately the first half hour after it is turned on, the desirable exposure will similarly vary with these factors. For best results, it is necessary for the operator to adjust the machine exposure control to compensate for these variables as well as for variations in the transparency of the original and the sensitivity of the sensitized copying sheet. A slow feed speed will give a long exposure, and a fast feed rate a short exposure. If the exposing lamp light output varies, it will be necessary to vary the feed speed inversely to maintain the same exposure.

It is an object of this invention to allow the convenient control of the exposure of a sensitized sheet in copying machines of the type described. It is a further object of this invention to automatically compensate for variations in lamp output due to electric power line voltage, lamp age, machine warm-up or other factors.

In one form of the present invention, a photoelectric cell is employed to sense the light output of the exposing lamp. The copying machine feed motor speed is controlled so as to be proportional to the product of the exposing lamp light output and the setting of an exposure control. Hence, for a given exposure control setting, the feed motor speed will be proportional to the lamp light output and will compensate automatically for the variations in lamp light output.

In the drawings, the figure is a schematic representation of one form of this invention.

The figure includes a photoelectric cell 11 whose anode connects via line 12 to the positive terminal of a battery 13. The cathode of photoelectric cell 11 connects via line 14 to a first side of potentiometer 15. The negative side of battery 13 connects via line 16 to ground 17. The second side of potentiometer 15 connects via lines 18 and 16 to ground 17. The movable arm of potentiometer 15 connects via line 19 to a first input of differential amplifier 20. The output of differential amplifier 20 connects via line 21 to an input winding of motor 22. Motor 22 is assumed to have an integral tachometer or feedback generator which generates a voltage proportional to its rotation speed. Such motor tachometer combinations are well known in the servomechanism field. Line 23 connects the tachometer output of motor 22 to a second input of differential amplifier 20.

In operation, photoelectric cell 11 is arranged so as to receive light from the exposing lamp 24 of the copying machine. The current through photoelectric cell 11 and, hence, the voltage across potentiometer 15 will be essentially proportional to the light output of the exposing lamp 24. Potentiometer 15 is used to set the desired exposure for the copying machine. The voltage on line 19 will be proportional to the product of the exposing lamp light output and the setting of potentiometer 15. The combination of differential amplifier 20, motor 22, and the feedback connection via line 23 is a simple servomechanism to drive motor 22 at a speed proportional to the voltage on line 19. If the voltage on line 19 is greater than the corresponding feedback voltage on line 23, the output of differential amplifier 20 will drive motor 22 so as to increase both the motor speed and the feedback voltage on line 23. Similarly, if the voltage on line 19 is less than the feedback voltage on line 23, the output of differential amplifier 20 will drive motor 22 at a lower speed so as to reduce the magnitude of the feedback voltage on line 23. Such motor speed control systems are well known in the servomechanism field.

Motor 22 is mechanically connected to the copying machine and the sheets 25 to be exposed are carried past the exposing lamp by known means, such as a belt 26 which is driven at a speed proportional to the speed of motor 22. Thus, the speed of motor 22, and the speed at which sensitive material is driven through the copying machine, will be proportional to the light output of the exposing lamp and the setting of an exposure control. Variations in exposing lamp light output will be automatically compensated for by corresponding changes in drive speed.

What is claimed is:

1. An exposure control for copying machines of the type in which light sensitive material is passed by a light source including a variable speed drive motor operable to move a sheet of the material past the light source, said motor including electrical feed back means delivering a signal proportional to its speed, photoelectric cell means to sense light from the light source and to deliver an electrical signal proportional to light output of the source, and circuit means for controlling the speed of said variable speed motor, said circuit means including differential amplifier means receiving an electrical signal from said photoelectric cell and from said feed back means of said motor, said differential amplifier controlling the speed of said motor so that the feed back signal and the signal received from said photoelectric cell means reach a desired ratio.

2. The combination as specified in claim 1 and an adjustable attenuator connected between the output of said photoelectric cell means and the input of said differential amplifier.

References Cited

FOREIGN PATENTS 598,035  5/1960  Canada.

NORTON ANSHER, *Primary Examiner.*

R. A. WINTERCORN, *Assistant Examiner.*